United States Patent
Li

(10) Patent No.: US 9,916,501 B2
(45) Date of Patent: Mar. 13, 2018

(54) SMART EYEGLASSES WITH IRIS RECOGNITION DEVICE

(71) Applicant: Yung-Hui Li, Taichung (TW)

(72) Inventor: Yung-Hui Li, Taichung (TW)

( * ) Notice: Subject to any disclaimer, the term of this patent is extended or adjusted under 35 U.S.C. 154(b) by 0 days.

(21) Appl. No.: 15/217,027

(22) Filed: Jul. 22, 2016

(65) Prior Publication Data

US 2018/0025226 A1 Jan. 25, 2018

(51) Int. Cl.
*G06K 9/00* (2006.01)
*G02C 11/00* (2006.01)

(52) U.S. Cl.
CPC .......... *G06K 9/00597* (2013.01); *G02C 11/10* (2013.01)

(58) Field of Classification Search
CPC ............. G06K 9/00597–9/00617; G02C 11/10
See application file for complete search history.

(56) References Cited

U.S. PATENT DOCUMENTS

| | | | | |
|---|---|---|---|---|
| 3,689,135 A * | 9/1972 | Young | ................... | A61B 3/112 351/210 |
| 5,621,424 A * | 4/1997 | Shimada | .............. | G02B 27/017 345/8 |
| 5,632,742 A * | 5/1997 | Frey | ........................ | A61B 3/113 606/12 |
| 5,907,722 A * | 5/1999 | Suzuki | ................... | G02B 7/287 396/51 |
| 6,091,899 A * | 7/2000 | Konishi | .................. | G03B 13/02 396/51 |
| 6,540,392 B1 * | 4/2003 | Braithwaite | ....... | G06K 9/00604 362/231 |
| 7,901,071 B1 * | 3/2011 | Kulas | ..................... | G02C 11/04 351/158 |
| 7,920,724 B2 | 4/2011 | Che et al. | | |
| 9,124,798 B2 * | 9/2015 | Hanna | ................ | H04N 5/23212 |
| 2006/0147094 A1 * | 7/2006 | Yoo | ..................... | G06K 9/00604 382/117 |
| 2006/0165266 A1 * | 7/2006 | Hamza | ............... | G06K 9/00597 382/117 |
| 2009/0115965 A1 | 5/2009 | Waldorf et al. | | |
| 2011/0150334 A1 | 6/2011 | Du et al. | | |
| 2012/0147328 A1 * | 6/2012 | Yahav | ..................... | A61B 3/113 351/210 |
| 2012/0293643 A1 * | 11/2012 | Hanna | ................ | G06K 9/00604 348/78 |
| 2013/0088583 A1 * | 4/2013 | Northcott | ........... | G06K 9/00604 348/78 |
| 2013/0120712 A1 * | 5/2013 | Spasovski | .............. | A61B 3/113 351/209 |

(Continued)

FOREIGN PATENT DOCUMENTS

TW    I315853 B    10/2009

*Primary Examiner* — Aaron W Carter
(74) *Attorney, Agent, or Firm* — Senniger Powers LLP

(57) ABSTRACT

Smart eyeglasses with iris recognition device comprise at least one glasses frame, a glasses arm connected to a side of the glasses frame; an iris recognition device installed on the glasses frame and having a recognition unit facing an inner side of the glasses frame. A light source device installed on the glasses frame projects a light on an inner side of an outer boundary of an iris of an eyeball, and not in contact with the outer boundary of the iris. The iris is sampled more easily and clearly with luminosity compensation of the light source device for enhancing the accuracy and sampling speed.

10 Claims, 3 Drawing Sheets

(56) References Cited

U.S. PATENT DOCUMENTS

| | | | |
|---|---|---|---|
| 2013/0178287 A1* | 7/2013 | Yahav | G02B 27/01 463/32 |
| 2014/0111766 A1* | 4/2014 | Umekawa | A61B 3/12 351/206 |
| 2014/0118680 A1* | 5/2014 | Chang | G02C 11/00 351/44 |
| 2014/0294235 A1 | 10/2014 | Ishida et al. | |
| 2015/0002676 A1* | 1/2015 | Yoo | G02B 27/017 348/159 |
| 2015/0009236 A1* | 1/2015 | Saito | G02B 27/017 345/656 |
| 2015/0098620 A1 | 4/2015 | Wu et al. | |
| 2015/0185505 A1* | 7/2015 | Das | G02C 7/083 349/13 |
| 2016/0014121 A1* | 1/2016 | Perna | G06K 9/0061 726/4 |
| 2016/0034759 A1* | 2/2016 | Jung | G06K 9/00604 348/164 |
| 2016/0037573 A1* | 2/2016 | Ko | H04L 63/0876 455/41.2 |
| 2016/0061613 A1* | 3/2016 | Jung | G01C 21/3632 701/49 |
| 2016/0106588 A1* | 4/2016 | Srinivasan | A61F 9/00825 606/5 |
| 2016/0196465 A1* | 7/2016 | Wu | G06K 9/0061 382/203 |
| 2016/0241553 A1* | 8/2016 | Kim | H04L 63/0861 |
| 2016/0299569 A1* | 10/2016 | Fisher | G02B 27/017 |
| 2017/0034858 A1* | 2/2017 | Yae | H04L 67/12 |
| 2017/0035608 A1* | 2/2017 | Boxer Wachler | A61F 9/008 |
| 2017/0061210 A1* | 3/2017 | Ollila | G06K 9/00604 |
| 2017/0078295 A1* | 3/2017 | Hwang | H04L 67/141 |
| 2017/0161506 A1* | 6/2017 | Gates | G06F 21/602 |
| 2017/0168566 A1* | 6/2017 | Osterhout | G06F 3/014 |

* cited by examiner

SMART EYEGLASSES WITH IRIS RECOGNITION DEVICE

TECHNICAL FIELD

The present invention relates to a biometric characteristics recognition device and more particularly to smart eyeglasses with iris recognition device.

BACKGROUND

In the recent years, biometric characteristics recognition has developed rapidly. A person's identity is recognized based on the individual biometric characteristics. It has gradually become very commonly used in many fields. Common biometric characteristics recognition such as facial characteristics recognition and fingerprint recognition have limitation in usage. Fingerprint can be easily forged, and is often affected by external factors because of frequent contact with the external environment. As a result, the fingerprint is changed and therefore cannot be recognized correctly. As for facial characteristics recognition, its low between-class variation causes poor recognition result. Besides, facial characteristics can also change due to the influence of external factors. Biometric characteristics recognition by using iris of human eyeball has high between-class variation and provides excellent result. External factors have insignificant influence on the recognition and therefore the accuracy is enhanced. No contact is required in the process of sampling. All these reasons help iris recognition to gain popularity in the recent years. The design of having iris recognition device directly installed on eyeglasses is already existed. Iris recognition can be processed directly by wearing eyeglasses. This allows a user's identity to be recognized by eyeglasses.

However, it is not easy to sample iris characteristics information by using the conventional iris recognition device installed on eyeglasses because of the limited distance between the eyeball and the eyeglasses. Therefore, it is a common problem of how to obtain effective and correct iris image for comparing and recognizing information.

SUMMARY

Smart eyeglasses with iris recognition device in accordance with aspects of the present invention comprise smart eyeglasses composed of at least one glasses frame, a glasses arm connected to a side of the glasses frame; an iris recognition device installed on the glasses frame and having a recognition unit facing an inner side of the glasses frame; and a light source device installed on the glasses frame and having a luminescent unit. A projected light of the luminescent unit is projected on an inner side of an outer boundary of an iris of an eyeball, and not in contact with the outer boundary of the iris.

The luminescent unit of the light source device of the smart eyeglasses with iris recognition device of the present invention provides an auxiliary luminosity for the eyeball. After a user has put on the smart eyeglasses, The projected light of the luminescent unit is projected on the inner side of the outer boundary of the iris of the eyeball for enhancing the iris brightness; not in contact with the outer boundary of the iris for reducing interference produced by the light; and enhancing the achievement ratio and speed of recognition of the iris recognition device. After the user has put on the smart eyeglasses, iris image retrieval and the iris recognition device are activated automatically. The user can continue to use other devices of the smart eyeglasses only after the user has passed the recognition.

Aspects of the present invention will become more fully understood by reference to the following detailed description thereof when read in conjunction with the attached drawings.

BRIEF DESCRIPTION OF THE DRAWINGS

FIG. 3 is an illustration of the smart eyeglasses with an iris recognition device in accordance with an embodiment of the present invention being put on.

Corresponding reference characters indicate corresponding parts throughout the drawings.

DETAILED DESCRIPTION OF THE INVENTION

Figure 1:
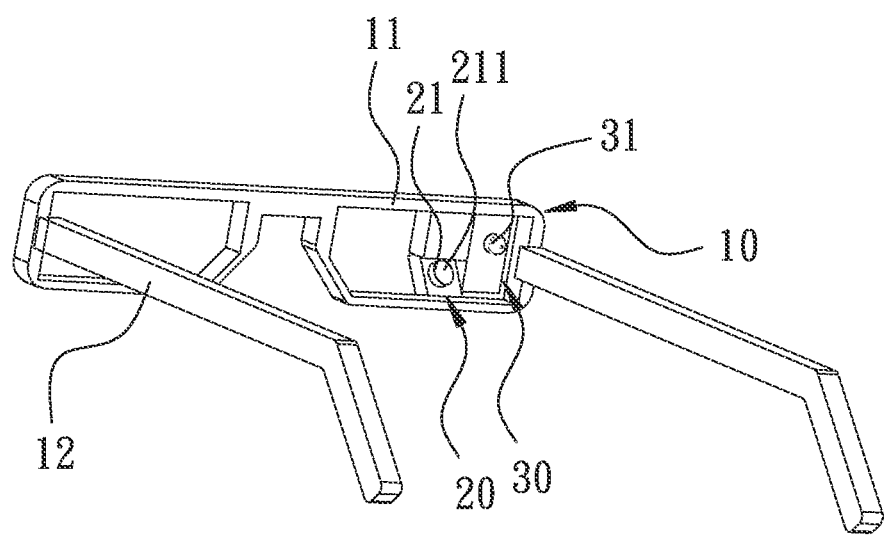
FIG. 1 is a perspective view of smart eyeglasses with iris recognition device in accordance with an embodiment of the present invention.

Please refer to FIG. 1. FIG. 1 is a perspective view of smart eyeglasses with an iris recognition device in accordance with an embodiment of the present invention.

Smart eyeglasses 10 with an iris recognition device as shown in FIG. 1 comprises a glasses frame 11, a glasses arm 12 connected to each side of the glasses frame 11 respectively, and a smart glasses module 13 disposed on a front of the glasses frame 11. In addition, smart eyeglasses 10 includes an iris recognition device 20 installed on the glasses frame 11 and having a recognition unit 21 facing an inner side of the glasses frame 11. The recognition unit 21 comprises a lens 211 and a light source device 30 installed on the glasses frame 11 and having a luminescent unit 31.

In an embodiment, the luminescent unit 31 projects an infrared light. The projected light of the luminescent unit 31 is projected on an inner side of an outer boundary 411 of an iris 41 of an eyeball 40, and not in contact with the outer boundary 411 of the iris 41.

Figure 2:
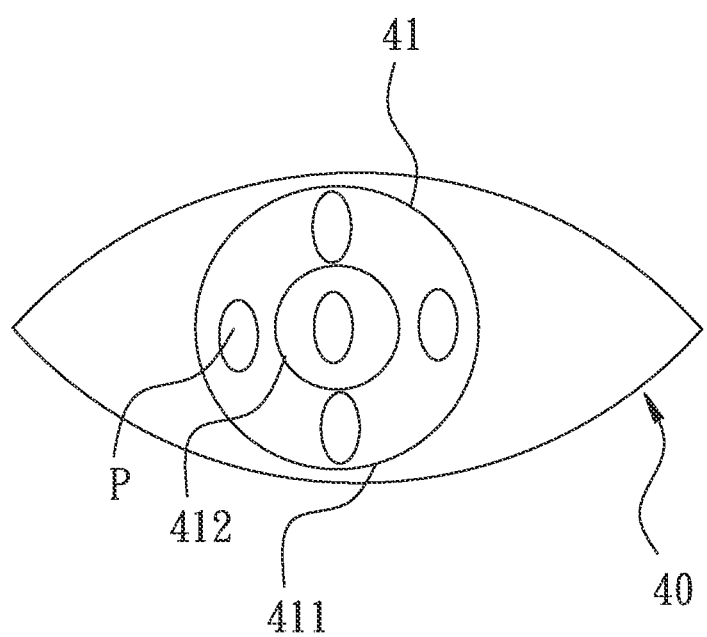
FIG. 2 is an illustration of a projected light of a luminescent unit projected on an eyeball.

Please refer to FIG. 2. FIG. 2 is an illustration of the projected light of the luminescent unit 31 projected on the eyeball 40. The outer boundary 411 is formed outside the iris 41 of the eyeball 40 and an inner boundary 412 is formed inside the iris 41. In this embodiment, the projected light of the luminescent unit 31 is projected on a location P located on a left side between the outer boundary 411 and the inner boundary 412 of the iris 41; and it can also be projected on other locations between the outer boundary 411 and the inner boundary 412 or inside the inner boundary 412; but it does not contact with the inner boundary 412 or the outer boundary 411.

Figure 3:
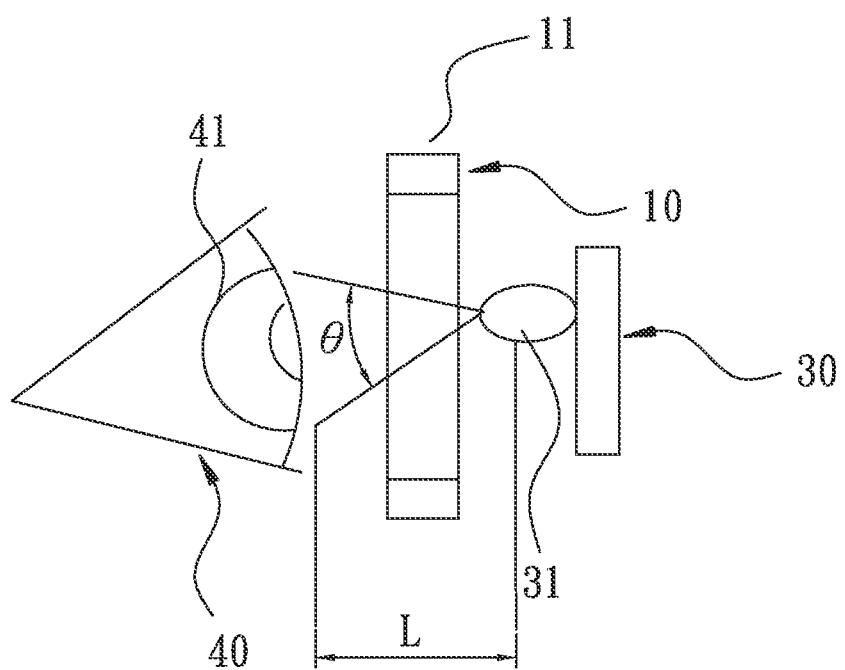

Please refer to FIG. 3. FIG. 3 is an illustration of the smart eyeglasses 10 with iris recognition device embodying aspects of the present invention being put on a head. In order for the light source device 30 to achieve the above-mentioned conditions, a distance L of approximately 1 to 10 cm is kept between the light source device 30 and the eyeball 40. A radiation angle θ of the luminescent unit 31 is 62°-6°. In this embodiment, the optimal distance L is 2 cm and the radiation angle θ is 33.4°.

A user can proceed with iris recognition after the smart eyeglasses 10 are put on. The light source device 30 compensates the luminosity for providing adequate light to allow the eyeball 40 of the user to be recognized by the iris recognition device 20 under any condition. Therefore, the accuracy and sampling speed can be enhanced. Furthermore, the projected light of the luminescent unit 31 does not contact with the outer boundary 411 or the inner boundary 412 of the iris 41, and therefore the problem of light interference is absent when the light is projected on the eyeball 40. Errors caused by the light can also be reduced during recognition. After the user has put on the smart eyeglasses 10, iris image retrieval and the iris recognition device 20 are activated automatically. The user can continue to use other devices of the smart glasses module 13 only after the user has passed the recognition.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. Smart eyeglasses with iris recognition comprising:
    smart eyeglasses having at least one glasses frame and a glasses arm connected to a side of the glasses frame;
    an iris recognition device installed on the glasses frame, said iris recognition device having a recognition unit facing an inner side of the glasses frame; and
    a light source device installed on the glasses frame and having a luminescent unit, wherein a projected light of the luminescent unit projects on an inner side of an outer boundary of an iris of an eyeball, the projected light is not in contact with the outer boundary of the iris, the luminescent unit is 2 cm away from the surface of the eyeball, and a radiation angle of the luminescent unit is 33.4°.

2. The smart eyeglasses as claimed in claim 1, wherein a location of the projected light of the luminescent unit is located inside an inner boundary of the iris, and wherein the projected light does not contact with the inner boundary of the iris.

3. The smart eyeglasses as claimed in claim 1, wherein the location of the projected light of the luminescent unit is located between the inner boundary and the outer boundary of the iris, and wherein the projected light does not contact with the inner boundary and the outer boundary of the iris.

4. The smart eyeglasses as claimed in claim 1, wherein the recognition unit is a lens.

5. The smart eyeglasses as claimed in claim 1, wherein the luminescent unit is an infrared light source.

6. A method of iris recognition comprising:
    illuminating an iris of an eyeball by a light source device installed on a glasses frame and having a luminescent unit, wherein illuminating includes projecting a light from the luminescent unit on an inner side of an outer boundary of the iris at a radiation angle θ when the glasses frame is worn by a user, the projected light is not in contact with the outer boundary of the iris, the luminescent unit is 2 cm away from a surface of the eyeball, and the radiation angle θ of the luminescent unit is 33.4°;
    viewing the iris by an iris recognition device installed on the glasses frame, wherein the iris recognition device has a recognition unit facing an inner side of the glasses frame; and
    performing biometric iris detection by the recognition unit based on the illuminated iris when viewed by the iris recognition device.

7. The method as claimed in claim 6, further comprising locating the projected light of the luminescent unit inside an inner boundary of the iris such that the projected light does not contact the inner boundary of the iris.

8. The method as claimed in claim 6, further comprising locating the projected light of the luminescent unit between the inner boundary and the outer boundary of the iris such that the projected light does not contact either the inner boundary of the iris or the outer boundary of the iris.

9. The method as claimed in claim 6, wherein the recognition unit is a lens.

10. The method as claimed in claim 6, wherein the luminescent unit is an infrared light source.

* * * * *